April 19, 1966  H. A. MACKIE  3,246,712
ANTI-DRIFT AIR CUSHION LOAD SUPPORTING DEVICE
Filed Sept. 13, 1963
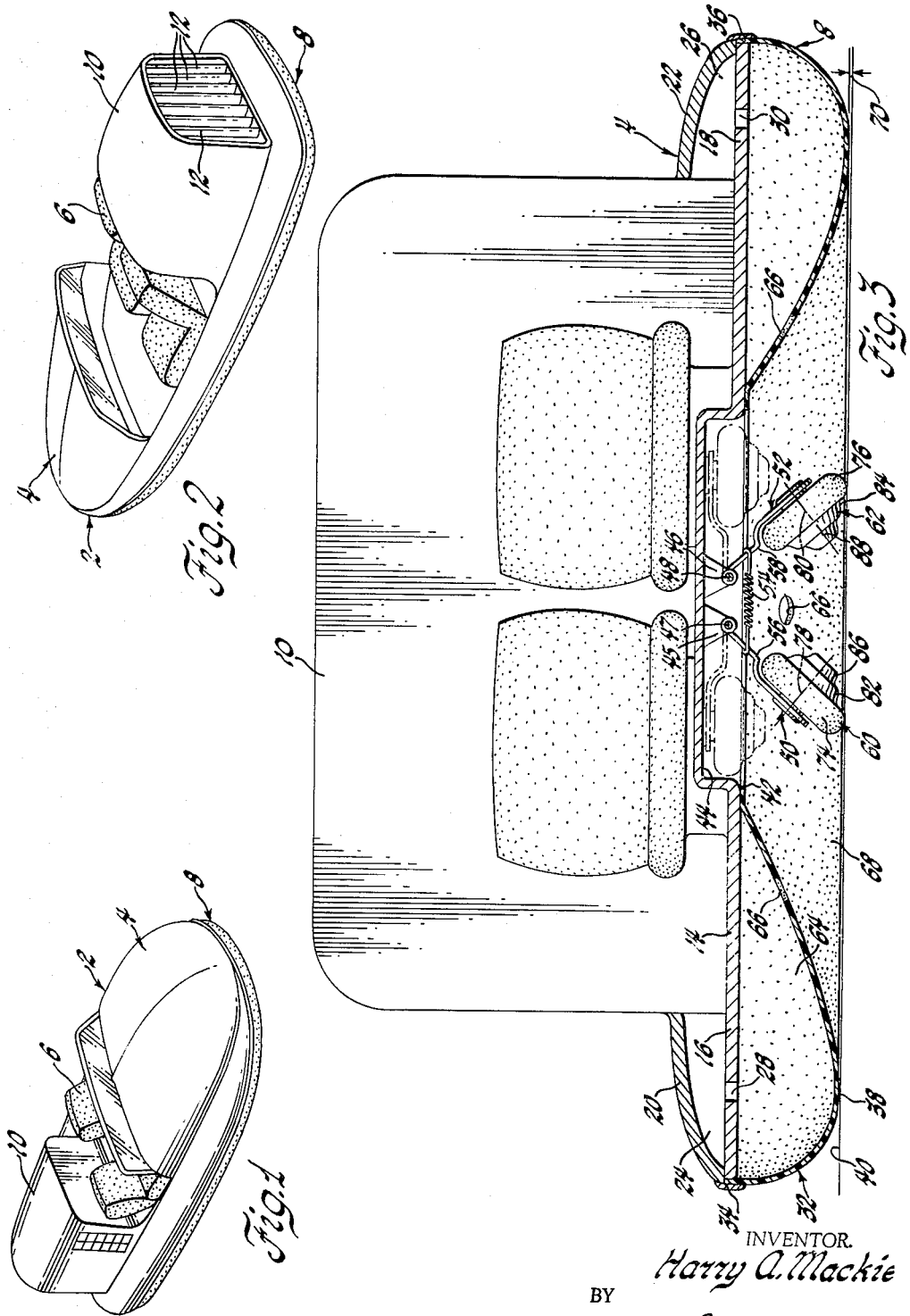
INVENTOR.
Harry A. Mackie
BY
W. F. Wagner
ATTORNEY United States Patent Office 3,246,712
Patented Apr. 19, 1966

3,246,712
ANTI-DRIFT AIR CUSHION LOAD SUPPORTING DEVICE
Harry A. Mackie, Birmingham, Mich., assignor to General Motors Corporation, Detroit, Mich., a corporation of Delaware
Filed Sept. 13, 1963, Ser. No. 308,742
7 Claims. (Cl. 180—7)

This invention relates to ground proximate air cushion supported vehicles and more particularly to air cushion vehicles utilizing aerodynamic propulsive means.

As used herein, the term "air cushion supported vehicle" refers broadly to a type of passenger and cargo carrying vehicle which is supported in substantially frictionless relation to the ground by means of a superambient cushion of air which is effective to both elevate the vehicle to a predetermined height above the ground and to support the vehicle relative to the ground for frictionless omnidirectional mobility.

The present invention is concerned primarily with vehicles of the general type described, which in addition to being omnidirectionally mobile, rely for propulsion on aerodynamic means rather than any form of wheeled or other ground engaging propulsive mechanism. Although in the recent past a variety of vehicles in this general category have been proposed, in general the condition of omnidirectional mobility inherent in the air cushion support has either rendered the vehicles more or less incapable of accurate directional control, or efforts to overcome this shortcoming has resulted in rather elaborate aerodynamic control mechanism. In the latter case, even the most comprehensive control arrangements still exhibit relatively inefficient ability to accomplish prompt control of drift and accuracy of steering.

An object of the present invention is to provide an improved air cushion supported ground proximate vehicle.

A further object is to provide a ground proximate air cushion supported vehicle of the type utilizing aerodynamic propulsion wherein means are provided for accomplishing prompt and positive drift control, and assuring improved precision of steerability.

Another object is to provide a device of the stated character wherein the drift control means function automatically as distinct from an arrangement requiring the introduction of corrective forces by the operator.

Still another object is to provide a ground proximate air cushion supported vehicle incorporating sprag means arranged centrally of the vehicle for swinging movement on an axis parallel to the longitudinal centerline of the vehicle.

A still further object is to provide a device of the stated character wherein the sprag means incorporate wheel elements which are freely rotatable in a path parallel to the longitudinal centerline of the vehicle.

A yet further object is to provide an arrangement of the stated character wherein the wheels are formed in cross-section so that progressively increasing surface area thereof engages the ground surface responsive to progressive upward angular inclination of the sprag means about its pivotal axis.

Yet another object is to provide an arrangement of the stated character wherein the sprag means automatically retract when the vehicle is inoperative.

These and other objects, advantages and features of the invention will become more fully apparent as reference is had to the accompanying specification and drawing wherein:

FIGURE 1 is a three-quarter front perspective view of the vehicle of the type incorporating the present invention;

FIGURE 2 is a three-quarter rear perspective view of the vehicle shown in FIGURE 1; and FIGURE 3 is a front elevational view, partly in section, taken transversely through the vehicle in a plane substantially intersecting the center of gravity of the vehicle, illustrating details of the invention.

Referring now to the drawings and particularly FIGURES 1 and 2, there is shown a passenger carrying self-propelled air cushion supported ground proximate vehicle 2 having a hull portion 4 including a passenger compartment 6. Disposed beneath hull 4 and the ground surface is an air bearing structure 8 adapted to establish and maintain the vehicle in substantially frictionless relation to the ground. Mounted on hull 4 rearwardly of the passenger compartment 6 is shroud 10 which encloses an engine driven propeller, not shown. The propeller functions to provide both aerodynamic forces to propel the vehicle and the superambient air pressure required to establish and maintain the air cushion. As seen best in FIGURE 2, in the embodiment shown, aerodynamic steering of the vehicle is accomplished by directionally controllable vanes 12 pivotally mounted on parallel vertical axes in the rear mouth or outlet of the shroud 10.

As seen best in FIGURE 3, the hull 4 is mounted on a horizontal supporting surface 14. The outer portions 16 and 18 of surface 14 cooperate with curved side wall portions 20 and 22 of the hull to form longitudinal chambers 24 and 26 which are arranged in communication with the interior of shroud 10 so that superambient air developed therein enters chambers 24 and 26 and is dischargeable downwardly through apertures 28 and 30 in outer portions 16 and 18.

Extending generally transversely beneath lower supporting surface 14 is a relatively thin flexible annular diaphragm 32, the outer periphery 34 of which is sealingly secured to the perimeter 36 of supporting surface 14. Diaphragm 32 is shaped to form a perimetrical depending convolution, the lower extremity 38 of which lies in close proximity to the ground 40 during vehicle operation. The inner periphery 42 of diaphragm 32 is sealingly connected to the lower wall portion 14 around the perimeter of an upwardly deformed central portion or recess 44 formed in wall 14.

Pivotally mounted within recess 44 on brackets 45 and 46 by pivot shafts 47 and 48 are a pair of laterally swingable sprag elements 50 and 52 which are lightly biased toward each other by interconnecting coil spring 54. Sprag elements comprise arm portions 56 and 58 having wheel elements 60 and 62 rotatably mounted on the free ends thereof on axes perpendicular to the axes of pivots 47 and 48. In the preferred embodiment, wheel elements 60 and 62 take the form of a multiplicity of axial abutting disks of progressively reduced diameter, the purpose of which will shortly be described.

Operation of the vehicle is as follows. Upon starting of the engine driven propeller, not shown, a continuous flow of air is generated, the major portion of which is discharged rearwardly through vanes 12 to accomplish forward propulsion of the vehicle. Through bleed-off duct work, not shown, communicating with chambers 24, 26, a portion of the generated air is discharged downwardly through apertures 28 and 30 to inflate the annular cavity 64 defined between diaphragm 32 and wall 14. This inflation elevates the vehicle to the height shown in FIGURE 2 and continued flow of air into annular chamber 64 is discharged through apertures 66 in diaphragm 32 into the plenum cavity 68 formed beneath the vehicle bounded by the lowermost extremity 38 of diaphragm 32. Superambient pressure within plenum 38 combined with the corresponding superatmospheric pressure within annular chamber 64 functions to support the entire vehicle in friction relation to the ground 40. Having established frictionless mobility as described, maintenance thereof requires only replacement of superambient air within annular chambers 64 and 68 at a rate equal to the rate of radial discharge of air from chamber 68 through the throttling gap 70 between ground surface 40 and the lowermost extremity 38 of diaphragm 32. During a period in which the vehicle is being elevated in the manner described, the sprag means 50 and 52 automatically descend from the retracted position in recess 44 shown in dashdot lines under the influence of spring 54 so that the perimeter 74 and 76 of wheels 60 and 62 are lightly biased into engagement with the ground surface 40. Upon forward propulsion of the vehicle in the manner previously described, movement of the vehicle in a straight line parallel to its longitudinal centerline causes the wheels 60 and 62 to rotate about their axes 78 and 80 without imposing resistance to vehicle movement. However, under conditions which would induce vehicle drift or movement transverse to the intended path of movement, the sprag means function in the well known manner to provide frictional resistance to such movement, but at the same time continue to exert no adverse influence with respect to forward movement. For example, if a wind condition exists which would tend to cause the vehicle to drift toward the left as seen in FIGURE 2, lateral movement of the vehicle superstructure exerts a component of force on arm 56 through pivot 47 which causes the perimeter 74 of wheel 60 to frictionally engage the ground in proportion to the lateral component of force exerted on the vehicle. Naturally, a reversal of drift tendency causes a comparable but reverse action on wheel 62. In accordance with one feature of the invention, the wheels 60 and 62 are shaped in cross section so that greater surface contact is established with the ground when the vehicle is more heavily loaded in order to provide correspondingly higher frictional resistance to drift. As will be evident from FIGURE 2, if the supported load on the hull 4 is sufficient to cause the vehicle to occupy a lower position relative to the ground than under the loaded condition illustrated, the entire supporting surface 14 will descend relative to the ground and the illustrated opposite angular inclination of sprags 50 and 52 will be increased so that additional surface contact is established with peripheries 82 and 84 or in the extreme case also with peripheries 86 and 88.

According to another feature of the invention, the sprag elements are pivoted to support 14 at a location which is substantially coincident with the center of gravity of the vehicle or approximately midway of the length of the vehicle. In this way, the sprag means 50 and 52 serve the additional purpose of augmenting aerodynamic steering of the vehicle which is basically accomplished by concerted angular inclination of the vanes 12. Depending on the angular orientation of the vanes, either the wheel 60 or wheel 62 will tend to establish a vertical steer axis and thereby eliminate the drift factor in steering response lag characteristic of pure low speed aerodynamic steering.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In combination with a ground proximate load carrying structure, means disposed between said structure and the ground providing a cushion of superambient air for supporting said structure in frictionless relation with the ground, directionally controllable aerodynamic means for steerably propelling the structure in a path along the ground, and ground engageable opposed sprag means pivotally mounted horizontally centrally on said structure for free swinging movement transversely of said path of movement.

2. In combination with a ground proximate load carrying structure, means disposed between said structure and the ground providing a cushion of superambient air for supporting said structure in frictionless relation with the ground, aerodynamic means for propelling the structure in a path along the ground, and ground engageable laterally oppositely extending freely swingable sprag means pivotally mounted on said stucture on laterally adjacent axes parallel to said path of movement.

3. In combination with a ground proximate load carrying structure, means disposed between said structure and the ground providing a cushion of superambient air for supporting said structure in frictionless relation with the ground, aerodynamic means for propelling the structure in a path along the ground, a pair of ground engageable freely swingable opposed sprags pivotally mounted on said structure on axes parallel to said path of movement, and wheels rotatably mounted on the free ends of said sprag means on axes lying in a plane perpendicular to said parallel axes.

4. In combination, a ground proximate load carrying structure, air bearing means disposed between said structure and the ground supporting said structure in frictionless relation with the ground, aerodynamic means for propelling the structure in a path along the ground, ground engageable laterally oppositely extending freely swingable sprags pivotally mounted at their inboard ends on said structure on axes parallel to said path of movement, wheels rotatably mounted on the outboard ends of said sprags on axes lying in a plane perpendicular to said parallel axes, and means interconnecting said sprag means urging the outboard ends of the latter toward each other.

5. In combination with a ground proximate load carrying structure, means disposed between said structure and the ground providing a cushion of superambient air for supporting said structure in frictionless relation with the ground, aerodynamic means for propelling the structure in a path along the ground, ground engageable laterally oppositely extending sprags pivotally mounted at their inboard ends on said structure for free swinging movement on axes parallel to said path of movement, wheels rotatably mounted on the outboard ends of said sprags on axes lying a plane perpendicular to said parallel axes, and resilient means continuously yieldably urging the outboard ends of said sprags toward each other.

6. The structure set forth in claim 4 wherein the pivotal mountings of the inboard ends of said arms are located substantially coincident with the center of gravity of said structure.

7. The structure set forth in claim 6 wherein said wheels are formed of a multiplicity of axially abutting portions of progressively reduced diameter with the direction of progressively reduced diameter being such that progressive lowering of said load carrying structure relative to the ground causes progressive increase in lateral ground engagement by said wheels.

References Cited by the Examiner

UNITED STATES PATENTS 3,095,938  7/1963  Bertelsen _____ 180—7
3,174,573  4/1965  Chaplin _____ 180—7

BENJAMIN HERSH, *Primary Examiner.*

MILTON S. SALES, *Assistant Examiner.*